United States Patent
Belknap et al.

(10) Patent No.: US 8,806,351 B2
(45) Date of Patent: Aug. 12, 2014

(54) SYSTEM AND METHOD FOR PACKING OF SMALL OBJECTS FOR EFFICIENT DELIVERY OVER NETWORKS

(75) Inventors: William Russell Belknap, San Jose, CA (US); Steven Victor Kauffman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2200 days.

(21) Appl. No.: 09/986,248

(22) Filed: Nov. 8, 2001

(65) Prior Publication Data

US 2003/0085920 A1    May 8, 2003

(51) Int. Cl.
*G06F 3/048* (2013.01)
*H04L 29/06* (2006.01)
*H04L 29/08* (2006.01)
*G06F 3/0481* (2013.01)

(52) U.S. Cl.
CPC ............ *H04L 29/06* (2013.01); *H04L 69/00* (2013.01); *H04L 67/02* (2013.01); *G06F 3/0481* (2013.01)
USPC ............................................. 715/748

(58) Field of Classification Search
CPC ............................ H04L 29/06; H04L 67/02
USPC ............ 345/748; 717/177, 178; 715/748, 749
See application file for complete search history.

(56) References Cited

U.S. PATENT DOCUMENTS

| | | | | |
|---|---|---|---|---|
| 5,309,555 A * | 5/1994 | Akins et al. | ............ | 715/756 |
| 5,689,286 A * | 11/1997 | Wugofski | ............ | 715/835 |
| 5,935,212 A * | 8/1999 | Kalajan et al. | ............ | 709/228 |
| 5,966,137 A * | 10/1999 | Murata | ............ | 345/629 |
| 5,995,091 A * | 11/1999 | Near et al. | ............ | 715/201 |
| 6,012,084 A * | 1/2000 | Fielding et al. | ............ | 709/205 |
| 6,075,943 A * | 6/2000 | Feinman | ............ | 717/175 |
| 6,083,279 A * | 7/2000 | Cuomo et al. | ............ | 717/118 |
| 6,125,388 A * | 9/2000 | Reisman | ............ | 709/218 |
| 6,282,711 B1 * | 8/2001 | Halpern et al. | ............ | 717/175 |
| 6,658,464 B2 * | 12/2003 | Reisman | ............ | 709/219 |
| 7,099,950 B2 * | 8/2006 | Jones et al. | ............ | 709/230 |
| 7,197,570 B2 * | 3/2007 | Eylon et al. | ............ | 709/231 |
| 7,461,150 B1 * | 12/2008 | Boulia | ............ | 709/227 |
| 8,086,662 B1 * | 12/2011 | Doyle et al. | ............ | 709/202 |
| 2003/0085920 A1 * | 5/2003 | Belknap et al. | ............ | 345/740 |
| 2003/0093321 A1 * | 5/2003 | Bodmer et al. | ............ | 705/26 |

FOREIGN PATENT DOCUMENTS

WO    WO 9845788 A1 * 10/1998 ............ G06F 17/00

OTHER PUBLICATIONS

Reilly, David, Hyper-text Transfer Protocol (HTTP) Overview, Jan. 1997.

* cited by examiner

*Primary Examiner* — Omar Abdul-Ali
*Assistant Examiner* — Anil Bhargava
(74) *Attorney, Agent, or Firm* — Sughrue Mion, PLLC (57) ABSTRACT

A method for requesting and processing a plurality of objects includes requesting a plurality of objects from a server, receiving a response message from the server, the response message containing the plurality of objects packed into the response message, and automatically unpacking the plurality of objects contained in the response message. The server includes an object packing module for packing requested objects into the response message. The client includes a plugin program that interacts with a network browser, in which the plugin program includes an unpacking module for unpacking the packed response message from the server. By delivering the plurality of requested objects in a single response message the objects are delivered over a single communication session thereby avoiding setting up and tearing down a plurality of communication sessions and reducing overhead processing. The objects can be thumbnail images forming the results of a search query.

16 Claims, 5 Drawing Sheets

PRIOR ART

SYSTEM AND METHOD FOR PACKING OF SMALL OBJECTS FOR EFFICIENT DELIVERY OVER NETWORKS

BACKGROUND OF THE INVENTION

1. Field of the Invention

The invention relates to network data communications methods and systems. More particularly, it relates to client-server data communications and the efficient delivery of objects identified in a search.

2. Description of the Related Art

The Internet, as it is popularly known, has become an important and useful tool for accessing a wide variety of information. One component of the Internet is the World Wide Web (hereinafter the web). In recent years the web has become an increasing popular vehicle for providing information to virtually anyone with access to the Internet. Many sites (hereinafter, websites) have been established to provide, over the web, information in many different forms, such as text, graphics, video and audio information.

A typical website is hosted on a network server computer that includes application software programs. The server, also known as a web server, is connected to the Internet. By connecting the web server to the Internet, clients that are connected to the Internet can access the website via the web server. Usually, a client is located remotely from the web server, although the client and the server can be at the same location. A web server also can be connected to a private intranet, as opposed to or in addition to the public Internet, in order to make a website privately available to clients within an organization. A conventional client-server communication system used on the web is shown on FIG. 1. The system includes a client communicating to a server over a network connection.

The client accesses the website by using a web browser. The web browser is a software program that runs on the client and receives from the server information formatted in a known manner. A very popular format for information sent over the web from a server to a client is the hypertext mark-up language (HTML). HTML is a tag-based script language, in which tags surround the information to be presented. By tagging the information to be sent to a browser, the browser can interpret the tags and handle the presentation of the information sent from the server. It is left to the web browser to determine the specific display formatting of the information, based on the tags included in the HTML file sent from the server. For example, information to be displayed at a client might include text and graphics. That text, and even the graphics can include, by way of the HTML tags, links to other data, where the links are associated with the web page being presented by the browser. The browser communicates with the server using the hypertext transfer protocol (HTTP). Accordingly, the client includes an HTTP software module for communicating over the Internet with the server.

The server includes a transaction processor as well as software for delivering an object and accessing an object. The server also has access to one or more data stores for storing objects. The server includes an HTTP module that operates according to the HTTP protocol, as is well known in the art of data communications over an Internet.

A user, through the client's browser, can request a web page stored at the server in one of the object stores. The server then locates and returns the web page to the client for display on the browser.

Many types of search engines are in use for locating information among the vast amounts of information accessible on the Internet. A search engine allows a user to search for occurrences of various types of information, such as text, graphics, etc., that are present and accessible through the Internet. A server, upon receiving a search request from a client, creates an HTML page that is returned to the browser. Displayed in the HTML web page are the results of the search, also known as search hits. These search results can include a list of text items describing the search hits. Alternatively, a server can return the search results in the form of graphical images, as opposed to a textual list, where the information to be located is graphical in nature. The returned graphical images typically are miniature renderings of larger graphical images, and are referred to as thumbnail images. The thumbnail image is used as a link to the full size version of the image. The server communicates the thumbnail images to the client browser by first sending to the browser an HTML page that includes links to the various thumbnail images. The browser, upon receiving the HTML page with the links to the thumbnail images then requests those thumbnail images, or more generally objects, individually.

The transmission control protocol (TCP)/internet protocol (IP), commonly referred to as TCP/IP, is a suite of protocols and services that are used to manage network communications and applications over the Internet. The TCP protocol is a transport layer protocol that provides a connection-oriented protocol that usually guarantees delivery across the network. To communicate using TCP/IP it is necessary to first set up a session when an object is to be requested. When negotiating a network session, the phase at the beginning of the communication process is called the setup. At set-up the protocol details, communication rates and error handling approaches are worked out, allowing the connection to proceed correctly and reliably. Once a session is setup, the TCP/IP protocol can be used to transport requests from the client to the server and responses from the server to the client.

Once the desired communication between client and server is complete, the client and the server agree to stop communicating and then systematically tear down the session and recover port addresses and other resources used for the session. When requesting a plurality of objects from the server and returning those objects to the client, the client and server often establish sessions for each one of those transactions. Establishing those sessions requires incurring the overhead of setup and tear down for each of those sessions. Accordingly, when a search results in identifying a plurality of thumbnail objects to be requested from a server many communication sessions are set up to transmit the objects individually. Consequently, those communication sessions also must be torn down, resulting in a high degree of overhead processing.

As search engines and applications deliver a plurality of objects, such as graphical objects, as opposed to a single page of search result text being returned, the overhead associated with returning those objects becomes more expensive both in terms of time and resources. Accordingly, there is a need to minimize the overhead involved in requesting and returning a plurality of objects, in a data communication system, such as the World Wide Web.

SUMMARY OF THE INVENTION

Therefore, in light of the above, and for other reasons that will become apparent when the invention is fully described, an object of the invention is to reduce the overhead associated with requesting and transferring a plurality of objects from a server to a client.

Another object of the invention is to minimize the number of sessions required to communicate search results to a client.

Yet another object of the invention is to reduce the amount of time required to communicate search results from a server to a client.

Still another object of the invention is to deliver search results to a client in an efficient manner while controlling the order of display of the returned objects on a browser.

The aforesaid objects are achieved individually and in combination, and it is not intended that the invention be construed as requiring two or more of the objects to be combined unless expressly required by the claims attached hereto.

In accordance with certain aspects of the invention, a client processor requests a plurality of objects from the server and receives a response message from the server in which the response message contains the plurality of objects packed into the response message. The client automatically unpacks the plurality of objects contained in the response message, and decompresses the plurality of unpacked objects if they have been compressed.

A server processor receives the request from the client for the plurality of objects and retrieves the plurality of requested objects from one or more object stores. The server processor automatically packs the retrieved plurality of objects into a response message and transmits the response message to the client. The server processor can also automatically compress the retrieved plurality of requested objects either before or after packing them into the response message. The server processor can pack the retrieved objects into the response message in a designated order, or designate a presentation order for each of the packed objects.

The above and still further objects, features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DETAILED DESCRIPTION

Preferred embodiments according to the present invention are described below with reference to the above drawings, in which like reference numerals designate like components.

Figure 1:
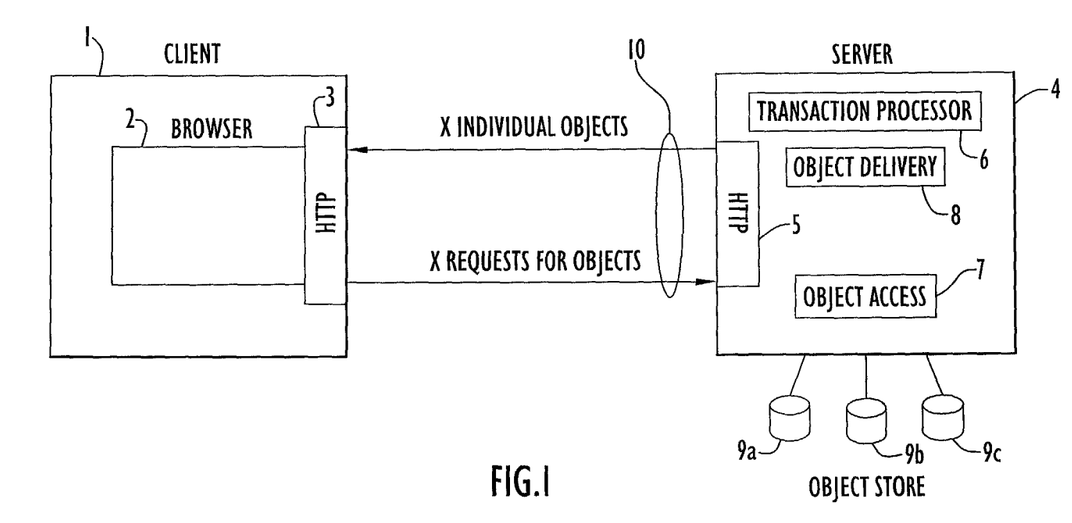
FIG. 1 depicts a conventional client-server system in which a plurality of objects are requested and returned using a plurality of communication sessions.

In a conventional client server system, as depicted in FIG. 1, a client 1 includes a browser 2 and an HTTP module 3 for communicating with a server 4. The server 4 includes an HTTP module 5 for handling the communication sessions between the client and server, and is similar to the client HTTP module 3. The client sends requests for objects by way of the HTTP modules 3 and 5. A transaction processor 6 within the server receives the transaction request and processes it to determine the subject matter of the request. The transaction processor 6 interacts with object access module 7. The object access module receives a request from the transaction processor for a particular object stored on one or more of a plurality of object stores 9a-9c. The object access module 7 retrieves the requested object and provides it to an object delivery module 8 within the server. The object delivery module 8 formats the object and prepares it for delivery over a communication path 10, using, for example, a TCP/IP session, by way of the HTTP modules 5 and 3. The individual object requested by the client is sent from the server to the client by way of the HTTP module 3 and provided to browser 2 for display to a user.

Figure 2A:
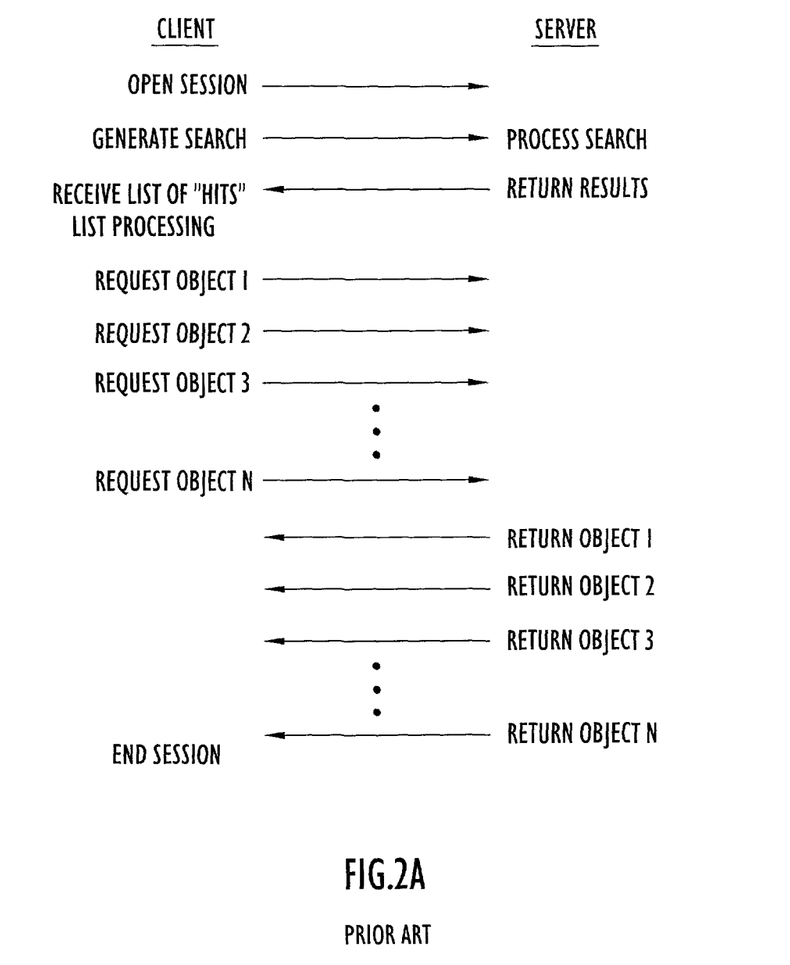
FIG. 2A illustrates a series of requests and responses between a client and a server using conventional techniques that use a plurality of responses deliver a plurality of requested objects.

FIG. 2A shows an example of a sequence of interactions between the client and the server. Here, the client opens a session, in this case a TCP session between the client and the server. Once the session is open the client then generates a search request that is provided to the server. The server processes the search request by determining search results and preparing those results for delivery to the client. The server returns the results using the TCP/IP session with the client. The client receives information satisfying the search request, referred to as a list of hits. The client processes the list of hits to determine specific objects, e.g., thumbnails, to request from the server. The client then prepares a series of requests for the objects to be retrieved. In the example illustrated by FIG. 2A, the client requests N objects, i.e., object 1 through object N. For each object, the client prepares a separate request for each object. As shown in FIG. 2A a total of N requests are sent from the client to the server. The server processes, with its transaction processor 6, each of the N requests, obtains the N objects by way of object access module 7, and sends each of the N objects to the client, as shown in FIG. 2A. The client then processes the returned objects, such as by displaying them using the browser 2. Once the client receives the last requested object the client ends the session with the server. In this case, although only a single session is used, the server must generate N responses for each of the N separate objects in response to the N requests from the client. By returning each of the requested objects individually, a large amount of overhead processing is associated with responding to each of the requests. Further, the client must individually process each of the N returned objects.

Figure 2B:
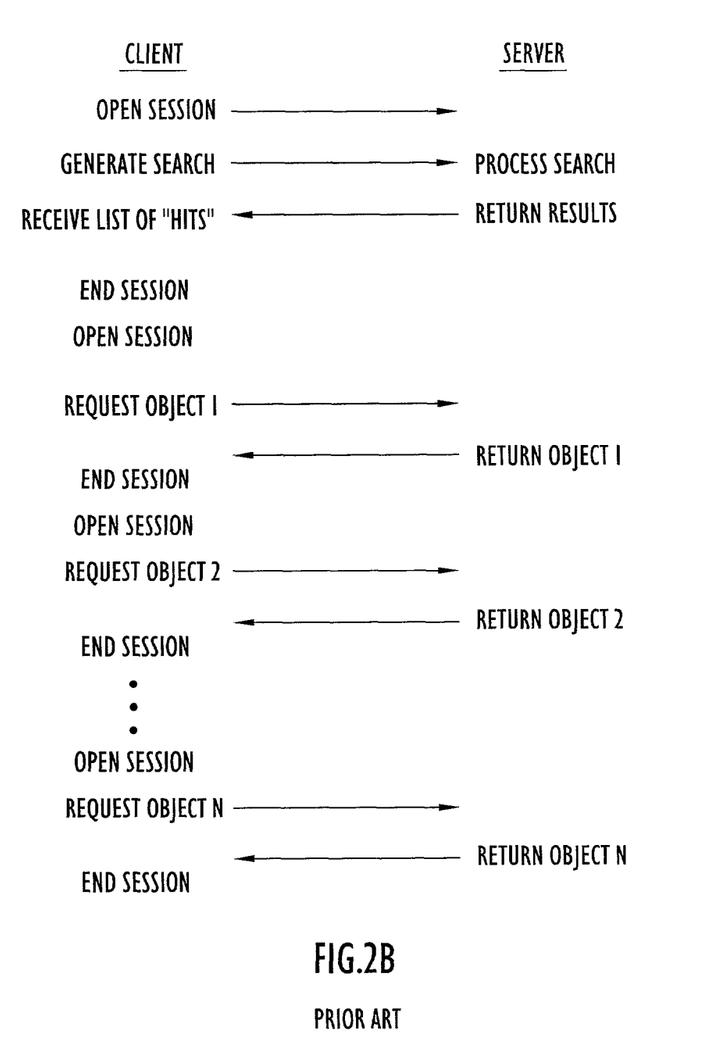
FIG. 2B illustrates a sequence of interactions between a client and a server in which a plurality of sessions are used to request and return a plurality of objects.

Another example of a conventional sequence of interactions between a client and a server is shown in FIG. 2B. Here again, the client opens a session with the server and generates a search request that is provided to the server. The server processes the search and returns results to the client in the form of a list of hits matching the search parameters. In this case, the client ends the session upon receipt of the list of search hits and sets up and uses individual sessions to request each of the identified objects. As shown in FIG. 2B the client transmits a request for object 1, which is listed in the list of search hits, once the session with the server is open. The server receives the request and through its transaction processor, object access module, and object delivery module retrieves the requested object 1, prepares it for delivery to the client and returns it to the client. Upon the client receiving object 1 the client ends the session.

In the same manner, the client then requests each of the remaining objects that are in the list of search hits. Alternatively, a user might select only certain ones of the objects listed as hits in the list returned from the server. In that case, where there are M hits in the search result list, the client requests N of the objects, where N<M. With respect to object 2 the client again opens a session with the server and requests object 2. The server returns object 2 to the client and then the session is torn down and ends. The sequence of opening sessions, requesting an object, returning the object and ending the session is repeated until all N requested objects are returned. As can be appreciated, the technique shown in FIG. 2B requires a substantial amount of overhead in opening and closing a session for each object requested. This overhead requires the availability and use of resources at both the client and the server and takes time in setting up and tearing down the many sessions.

The objects returned by the server can be in virtually any format. While the objects can be text objects for display on the browser, the objects also can be other types of objects such as graphical images, e.g., thumbnail images, for delivery and display on the browser. By displaying thumbnail images to depict the search results, a user is given a visual indication of the objects that can be requested and retrieved. Upon selecting an object for retrieval, such as positioning a mouse cursor over the thumbnail image of interest and selecting it using the mouse, a full size object corresponding to the selected thumbnail is requested and sent from the server to the client. Still other types of objects can be used to present the search results such as other graphics objects, for example, GIF, JPEG and BMP files, banners, flash objects and other web icons, as well as other types of objects such as rich media objects, e.g., audio clips, etc. Essentially, any type of object that can represent information can be returned for presentation at a client.

Figure 3:
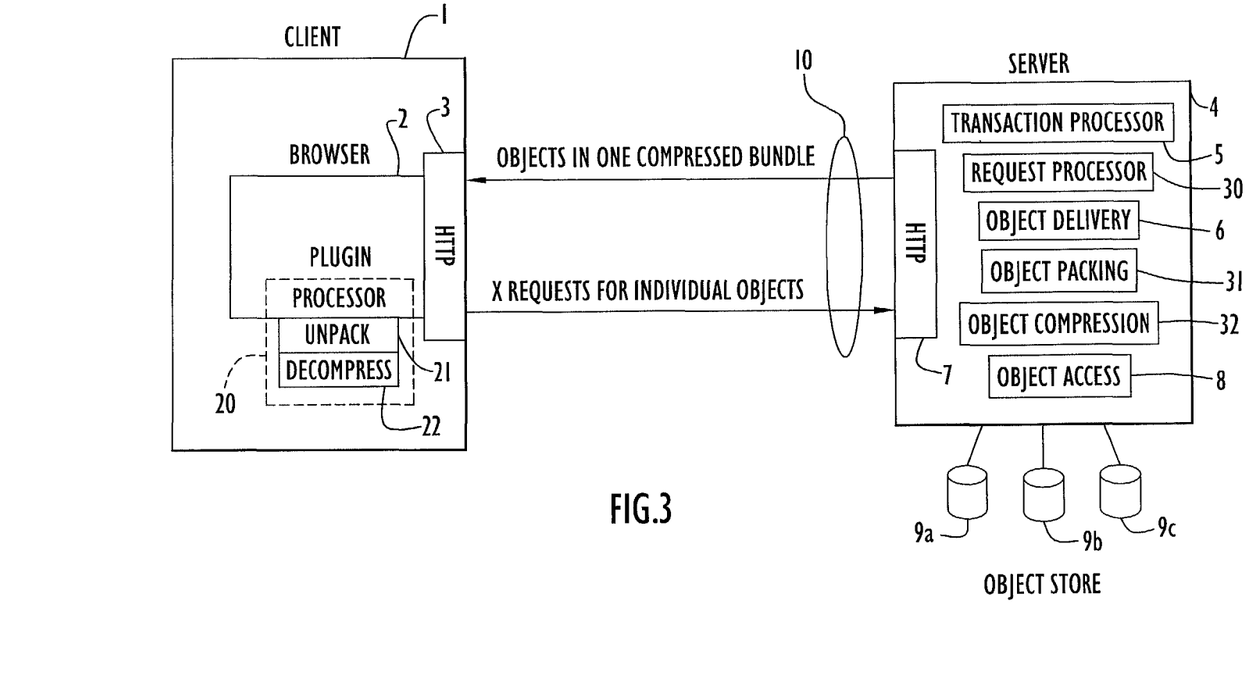
FIG. 3 illustrates a client-server system in accordance with certain aspects of the invention in which a plurality of objects are returned in a compressed bundle.

A client-server system shown in FIG. 3 avoids the need to setup and teardown individual sessions for each of the requested objects. Using the system of FIG. 3 also can avoid having to return a plurality of objects individually, thereby minimizing the amount of overhead processing both at the server and client in handling those objects individually.

In FIG. 3 the client preferably includes a plugin module 20 that operates with the browser 2. The plugin module runs on a processor and includes an unpacking module 21 and a decompression module 22. The server 4 also includes, in addition to the transaction processor 5, a request processor 30 configured to process the individual requests received from the client. An object packing module 31 is configured to operate in conjunction with an object compression module 32. The object compression module 32 operates to compress objects retrieved from object stores 9a-9c by way of object access module 8. The object packing module 31 operates to pack the compressed objects into a single response message for delivery to the client. Preferably, the object compression module 32 compresses the objects before they are packed, although alternatively, the packed response message that is output from the object packing module 31 might include uncompressed objects. In that case, the object compression module 32 can be configured to compress the packed response message after the objects are packed into that response message.

The response message is passed from the object packing module 31 to the object delivery module 6. The object delivery module 6 interacts with the HTTP module 7 for delivering the packed response message to the client over the communication path 10.

The client 1 upon receiving the packed response message by way of the HTTP module 3 passes the packed response message to the plugin module 20. The plugin module 20 receives the packed response message and unpacks it using the unpacking module 21 to recover the individual objects. If the recovered objects are compressed the decompression module 22 decompresses the unpacked objects. Alternatively, the decompression module 22 can be configured to decompress the response message and then the unpacking module can unpack the decompressed response message, if the compression was performed after the objects were packed into the response message in server 4. The browser 2 then displays the unpacked and decompressed objects.

Alternatively, the plugin module, by way of the processor, can further process the unpacked requested objects. That is, the processor can place the unpacked objects in an order for handling accordingly to an algorithm within the plugin module. For example, the plugin can arrange the unpacked objects for display in a particular order on the browser 2. Conventionally, the objects are displayed on the browser in the order they are received from the server, because they are not delivered to the browser in a single bundle. Such an order, however, is not necessarily the order in which the objects are intended to be displayed. Delivering the objects in a bundle also enables other processing to be performed on the unpacked objects.

Figure 4:
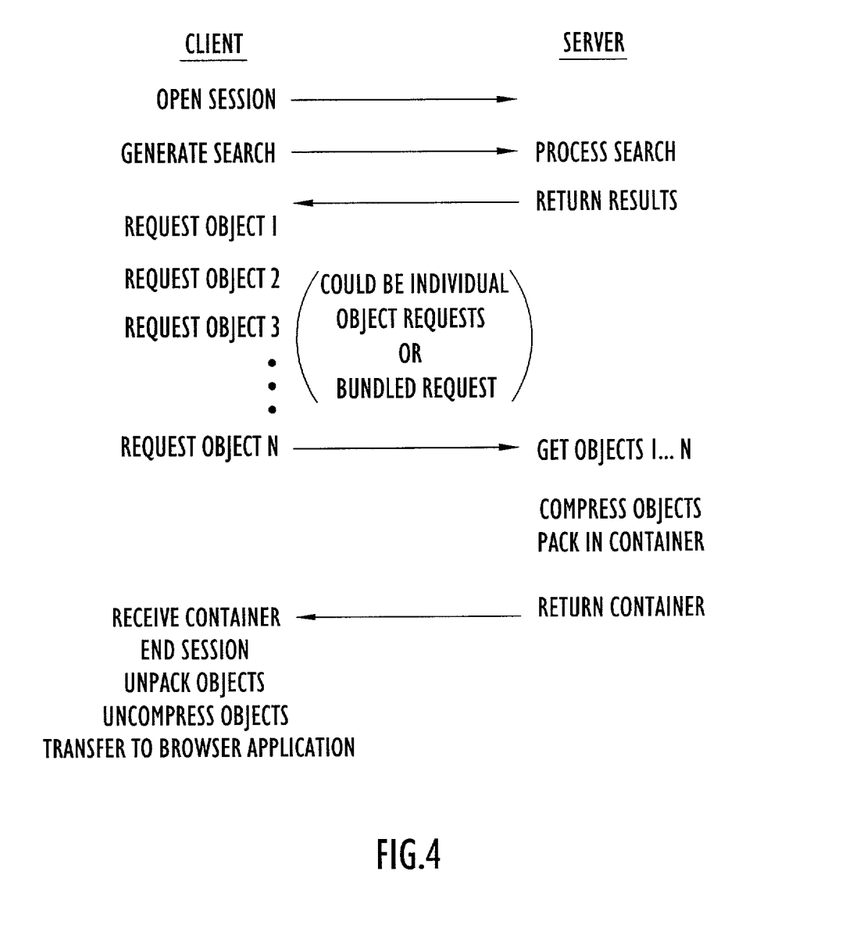
FIG. 4 illustrates an exemplary sequence of communications between a client and a server, according certain aspects of the invention, in which a plurality of requests are made for objects and a single compressed object packed in a container is returned to the client.

FIG. 4 shows an exemplary sequence of messages between a client and server using the client-server system shown in FIG. 3. Here, the client begins by opening a session with the server and generating a search request. The server processes the search request, determines the search results and returns those results to the client. The client then requests one or more of the objects designated in the search results. Assuming, M hits are returned in the search results, for example, the user can request up to M of the objects from the server. Here, the user requests N of the objects, where N≤M. Those N requests can be made individually or they can be bundled into a single request by the plugin module. Where the objects are bundled into a single request, the plugin module includes a client bundling unit or a packing unit similar to the object packing module 31 in the server. The client packing unit packs the requests into a single message and sends a single message from the client to the server to retrieve the N. In that case, the server 4 includes unpacking and decompression modules similar to the unpacking module 21 and decompression module 22 in the client 1.

The server, if receiving individual requests from the client, processes each of those requests using the request processor 30. However, rather than individually responding to each of the requests the request processor operates in conjunction with the object packing module 31 and object compression module 32 to compress and pack the requested objects obtained by way of object access module 8 into a single container. The single container, such as a response message unit, is then returned from the server to the client. The client, upon receiving the response message, passes the message to the plugin module for unpacking and decompressing the message. Upon receiving the response message the client ends the session. The objects are then unpacked, decompressed and transferred to the browser for presentation to the user. Although the figures show performing the unpacking and decompression after the session has ended, alternatively, those operations can be performed before the session has ended, however it is not necessary to do so.

As can be seen in FIG. 4 a single session is used to request and receive search results and to request and receive a plurality of objects. Alternatively, a plurality of requests can be made to request each of the N objects using a plurality of sessions while using only a single session to return the single response message containing each of the requested objects to the client.

In the manner described above, the client-server system can operate efficiently and effectively when a plurality of objects is requested from the server for return to the client.

The response message output from the server to the client includes data fields sufficient to delineate each of the objects returned within the response message. The specific layout and format of the data fields used in the response message will depend on the packing techniques employed by the object packing module. Preferably, the response message includes a directory area having information identifying and describing the objects packed into the response message. Preferably, the directory includes a directory entry for each object packed into the response message. A directory entry can include an object name or ID field containing the object's name or ID, a type field (mime) with information specifying the type of object, and a size field indicating the size of the object. Still other information can be included in a response message directory depending on the needs and capabilities of the browser.

For example, the directory can also include, either for each directory entry or for the entire packed message, a presentation order field indicating the order in which the packed objects are to be presented by the browser. The browser queues the requests waiting for the respective responses. When the browser receives a response to a request it processes that response and presents it to a user upon receipt. When the plugin module unpacks objects from a response message and transfers an unpacked object to the browser, the browser receives the object as if the object were returned by itself over the network in response to a queued request. The browser then presents that object once it receives it. By the plugin module transferring an object to the browser in the order specified by an order field in the response message, the plugin module controls the order in which objects are passed to the browser, which thereby controls the order of presentation of the objects by the browser.

An example of an object packing module 31 that can be used in server 4 is software program that packs the retrieved objects into a ZIP format using known ZIP packing techniques. Similarly, the object compression module 32 can use well-known compression techniques to compress the objects either before packing or to compress the response message once the objects are packed into the response message. In the case of using a ZIP packing module the objects reside in their respective formats on the object stores 9a-9c and are packed together by placing them into a ZIP object in response to the request processor 30 requesting the specific objects requested by client 1. Packing the objects occurs automatically in response to and under the control of the request processor 30.

Once the packed response message is sent to the client 1 and upon the plugin module receiving the response message the plugin module 20 automatically passes the zipped object to the unpacking module 21. The unpacking module 21 automatically performs an unzip operation, if the server object packing module 31 packed the objects in a ZIP format, to thereby unpack the objects within the ZIP object. The decompression module 22 then decompresses any objects that have been compressed. These operations are performed automatically without user intervention, unlike conventional uses of ZIP files in which a user manually zips, or places, files into a ZIP file and then manually controls the unzipping of the ZIP file. Moreover, it should be noted that the object packing module 31 under the control of request processor 30 dynamically builds the ZIP object on the server without user interaction. Such a ZIP object is built dynamically using the objects requested by the client 1.

Alternatively, the object store can store a static packed object having a plurality of objects that have been prepacked and precompressed. Such static packed objects can be used, for example, to respond to a predefined query from the client. In such an embodiment in which the objects are packed prior to receiving a request, the client plugin module 20 detects that the response message contains objects packed in a predetermined format and automatically unpacks the message using the appropriate unpacking algorithms. An example of a use of static packed objects arises when a web page having a plurality of static objects, such as thumbnail images, is predefined for searches that are preformed frequently. The thumbnail images for the web page are known prior to receiving a search request. Accordingly, those thumbnail images are statically compressed and packed into a single object, ready for delivery when a request is received by the server. By the server storing static packed objects, browsing such static thumbnail web pages is greatly accelerated. This is because the process of the server gathering, compressing and packing all of the requested objects is performed only once when the static web page is first defined, and is not performed at the time the request is received.

It will be understood that the request processor 30, object packing module 31, object compression module 32, as well as the transaction processor 5, object delivery module 6 and object access module 8 can be implemented as software programs. Such software is embodied on a computer-readable medium of expression, such as magnetic media, optical disks, semiconductor memories, etc. The software instructions within these modules, when executed by a computer, cause the computer to perform the functions described above. It will also be understood that the functions described above can be performed using appropriately configured hardware or combinations of hardware and software. Likewise, the plugin module 20, including the unpacking and decompression modules, preferably are implemented as software with computer-readable instructions recorded on a computer readable medium such as magnetic media, optical disks, semiconductor memories, etc.

Having described preferred embodiments of systems and methods for packing objects for efficient delivery over networks, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of requesting and processing a plurality of objects from a server, comprising:

opening a session with the server;

requesting the plurality of objects from the server, wherein the plurality of objects comprise graphical images displayable on a web page by a web browser;

receiving a response message from the server, the response message containing the plurality of objects packed into the response message;

ending the session with the server after the receiving the response message;

automatically unpacking the plurality of the packed objects contained in the response message for displaying on the web page by the web browser; and displaying on the web page, the plurality of the unpacked objects comprising the graphical images in a second order provided in the response message, wherein the second order is different from a first order in which the plurality of the packed objects are unpacked from the response message.

2. The method of claim 1, further comprising decompressing the plurality of the unpacked objects.

3. The method of claim 2, wherein the decompression of the plurality of the unpacked objects is performed automatically in response to receiving the response message.

4. The method of claim 1, wherein a plugin module that operates with the web browser is provided in a client and wherein the plugin module automatically unpacks the graphical images contained in the response message, and provides the graphical images to the web browser for display on the web page.

5. The method of claim 1, wherein the opening the session comprises opening a transmission control protocol (TCP)/internet protocol (IP) session using hypertext transfer protocol (HTTP).

6. The method of claim 5, wherein a client opens the TCP/IP session with the server, the client comprises an HTTP module for communicating to the server using the HTTP.

7. The method of claim 1, wherein the plurality of objects are packed into the response message prior to receiving a request for the plurality of objects, and the response message comprises an indicator of 1the second order in which the plurality of packed objects are to be displayed on the web page.

8. A client processor, comprising:
a processor;
a communications module, executed on the processor, configured to open a session with a server, configured to request a plurality of objects from the server, configured to receive a response message from the server, the response message containing the plurality of objects packed into the response message, and configured to end the session with the server after receiving the response message, wherein the objects comprise graphical images displayable on a web page;
an unpacking module configured to automatically unpack from the response message the plurality of packed objects; and
a browser coupled to the unpacking module, configured to display on the web page the plurality of unpacked objects,
wherein the browser is further configured to display on the web page, the plurality of unpacked objects comprising the graphical images in a second order provided in the response message, wherein the second order is different from a first order in which the plurality of the packed objects are unpacked from the response message.

9. The client processor of claim 8, further comprising a decompression module configured to decompress the plurality of unpacked objects.

10. The client processor of claim 9, wherein the decompression module is configured to automatically decompress the plurality of unpacked objects in response to receiving the response message.

11. The client processor of claim 8, wherein the communications module configured to open the session opens a transmission control protocol (TCP)/internet protocol (IP) session using hypertext transfer protocol (HTTP).

12. The client processor of claim 8, wherein the plurality of objects are packed into the response message prior to receiving a request for the plurality of objects, and the response message comprises an indicator of the second order in which the plurality of packed objects are to be displayed on the web page.

13. A non-transitory computer-readable storage medium of instructions for requesting and processing a plurality of objects from a server, comprising:
program operations for opening a session with the server;
program instructions for requesting the plurality of objects from the server, wherein the objects comprise graphical images displayable on a web page by a web browser;
program instructions for receiving a response message from the server, the response message containing the plurality of objects packed into the response message;
program instructions for ending the session with the server after the receiving the response message;
program instructions for automatically unpacking the plurality of objects contained in the response message for displaying on the web page by a web browser; and
program instructions for displaying on the web page, the plurality of unpacked objects comprising the graphical images in a second order provided in the response message, wherein the second order is different from a first order in which the plurality of the packed objects are unpacked from the response message.

14. The computer-readable storage medium of instructions of claim 13, further comprising program instructions for decompressing the plurality of unpacked objects.

15. The computer-readable storage medium of claim 13, wherein the program operations for opening the session comprise program operations for opening a transmission control protocol (TCP)/internet protocol (IP) session using hypertext transfer protocol (HTTP).

16. The computer-readable storage medium of claim 13, wherein the plurality of objects are packed into the response message prior to receiving a request for the plurality of objects, and the response message comprises an indicator of the second order in which the plurality of packed objects are to be displayed on the web page.

* * * * *